(12) United States Patent
Stoll

(10) Patent No.: US 6,625,772 B1
(45) Date of Patent: Sep. 23, 2003

(54) CIRCUIT ARRANGEMENT AND METHOD FOR MINIMIZING BIT ERRORS

(75) Inventor: Detlef Stoll, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/486,943

(22) PCT Filed: Aug. 18, 1998

(86) PCT No.: PCT/DE98/02402
§ 371 (c)(1),
(2), (4) Date: Mar. 2, 2000

(87) PCT Pub. No.: WO99/12315
PCT Pub. Date: Mar. 11, 1999

(30) Foreign Application Priority Data

Sep. 2, 1997 (DE) .......................................... 197 38 362

(51) Int. Cl.$^7$ ................................................ G06F 11/00
(52) U.S. Cl. ........................................ 714/746; 714/704
(58) Field of Search ................................. 714/751, 752, 714/757, 746, 704

(56) References Cited

U.S. PATENT DOCUMENTS

| | | | | |
|---|---|---|---|---|
| 5,182,467 A | | 1/1993 | Taylor et al. | |
| 5,477,551 A | * | 12/1995 | Parks et al. | 714/758 |
| 5,509,020 A | * | 4/1996 | Iwakiri et al. | 714/704 |
| 5,513,191 A | * | 4/1996 | Takechi et al. | 714/752 |
| 5,677,935 A | * | 10/1997 | Karino | 375/368 |
| 5,809,031 A | * | 9/1998 | Horikawa et al. | 370/506 |
| 5,809,406 A | * | 9/1998 | Taki et al. | 455/135 |
| 5,896,391 A | * | 4/1999 | Solheim et al. | 714/704 |
| 5,896,392 A | * | 4/1999 | Ono et al. | 714/705 |
| 5,937,016 A | * | 8/1999 | Choi | 375/341 |
| 5,987,631 A | * | 11/1999 | Kong | 714/704 |
| 6,188,737 B1 | * | 2/2001 | Bruce et al. | 375/355 |
| 6,226,768 B1 | * | 5/2001 | Chujo et al. | 714/746 |
| 6,373,405 B1 | * | 4/2002 | Nakatsugawa | 341/50 |
| 6,530,055 B1 | * | 3/2003 | Fukunaga | 714/746 |

FOREIGN PATENT DOCUMENTS

| | | |
|---|---|---|
| DE | 32 41 648 C2 | 12/1991 |
| EP | 0 328 266 A2 | 8/1989 |
| EP | 0 455 910 A2 | 11/1991 |
| EP | 0 744 848 A1 | 11/1996 |

OTHER PUBLICATIONS

Patent Abstracts of Japan, JP 07 262704 A, Oct. 13, 1995.
J. Malcolm Keelty et al., "On–Line Pseudo–Error Monitors for Digital Transmission Systems", IEEE Trans., vol. COM–26, Aug. 1978, pp 1275–1282.

* cited by examiner

*Primary Examiner*—Albert Decady
*Assistant Examiner*—Anthony T. Whittington
(74) *Attorney, Agent, or Firm*—Bell Boyd & Lloyd LLC

(57) ABSTRACT

A circuit arrangement and method for minimizing bit errors, whereby respective corresponding bits of a bit sequence are compared to a corrected bit sequence or to an error signal and, given non-coincidence, the neighboring bits of the corrected bit sequence are utilized for correction of a decision criterion formed from the sampling time and a threshold.

13 Claims, 3 Drawing Sheets

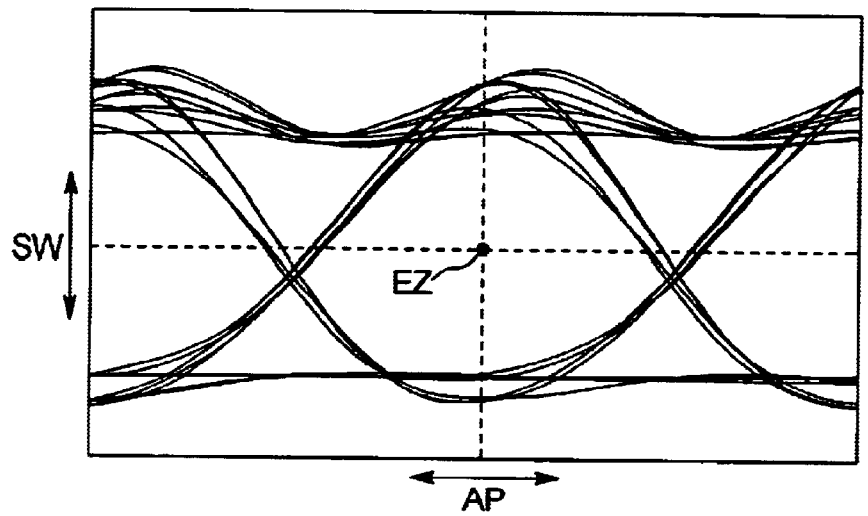
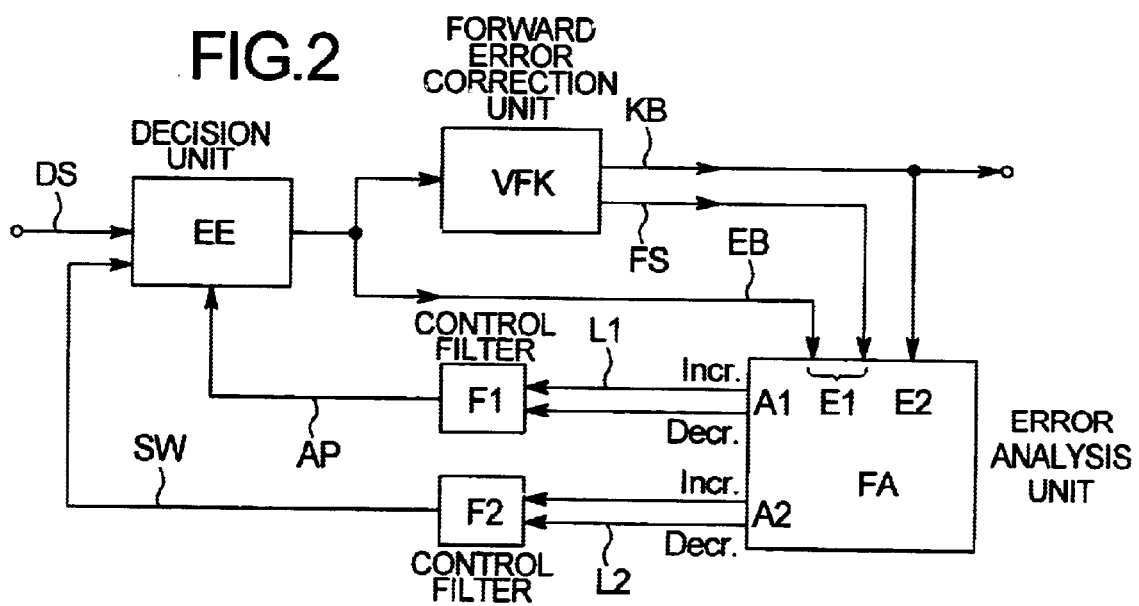

FIG 5

| KB Bit N-1 | KB Bit N | KB Bit N+1 | Error signal FS | EB Bit N | Sampling time AP Incr.(→) | Sampling time AP Decr.(←) | Threshold value SW Incr.(↑) | Threshold value SW Decr.(↓) | Region cf. Fig.4 |
|---|---|---|---|---|---|---|---|---|---|
| 0 | 0 | 0 | 0 | 0 | 0 | 0 | 0 | 0 | - |
| 0 | 0 | 0 | 1 | 1 | 0 | 0 | 1 | 0 | (C), (D) |
| 0 | 0 | 1 | 0 | 0 | 0 | 0 | 0 | 0 | - |
| 0 | 0 | 1 | 1 | 1 | 0 | 0 | 1 | 0 | (D) |
| 0 | 1 | 0 | 1 | 0 | 0 | 1 | 0 | 1 | (A), (B) |
| 0 | 1 | 0 | 0 | 1 | 0 | 0 | 0 | 0 | - |
| 0 | 1 | 1 | 1 | 0 | 1 | 0 | 0 | 1 | (A) |
| 0 | 1 | 1 | 0 | 1 | 0 | 0 | 0 | 0 | - |
| 1 | 0 | 0 | 0 | 1 | 0 | 0 | 0 | 0 | - |
| 1 | 0 | 0 | 1 | 0 | 0 | 0 | 1 | 0 | (C) |
| 1 | 0 | 1 | 1 | 1 | 0 | 1 | 1 | 0 | (C), (D) |
| 1 | 1 | 0 | 0 | 0 | 0 | 0 | 0 | 1 | (B) |
| 1 | 1 | 0 | 1 | 1 | 0 | 0 | 0 | 0 | - |
| 1 | 1 | 1 | 1 | 1 | 0 | 0 | 0 | 0 | (A), (B) |

CIRCUIT ARRANGEMENT AND METHOD FOR MINIMIZING BIT ERRORS

BACKGROUND OF THE INVENTION

1. Field of the Invention

The invention relates to the field of digital data communication systems and a circuit arrangement and method for minimizing bit errors in such systems.

2. Description of the Related Art

In a digital receiver, digital data such as that transmitted via optical fibers or coaxial cables are converted back into digital data in the receiver by sampling the received signal. At a specific sampling time, a threshold decision is made as to whether a high or low voltage potential value is assigned to the received signal in a sampling interval.

For known receiver units, it is a standard practice that the sampling time at the height of the threshold for the threshold decision is determined and set upon initialization of the receiver unit. Due to changing system properties, however, the required values for an optimum sampling time and the optimum threshold change. Degeneration of values set once for initialization of the receiver unit are kept slight by a decision process when the changing system properties of the receiver unit are utilized in determining of the sampling time as well as of the threshold.

Given receiver units in ultra-high rate optical transmission systems in which it is not possible to adequately prescribe the system reserves in such a way, a monitoring path for setting the sampling time and/or the threshold is utilized in addition to a signal path. In a receiver unit in this type of transmission system, a first decision unit is integrated in the signal path and a second decision unit is integrated in the monitor path. The inputs of the first and second decision units are charged with the same received signals. The second decision unit in the monitor path serve, by a variation such as an artificial deterioration of the threshold and of the sampling time to respectively determine an optimum value for these without negatively influencing quality of the transmitted signal in the signal path. Whenever an improvement compared to the signal path has been identified, the first decision unit in the signal path takes the optimized values for the sampling time and the threshold.

In another method for controlling the threshold, given the precondition that the plurality of zeroes and ones of the transmitted digital signal sequence are in equally distributed, in a criterion for an optimized threshold control is derived by average formation in transmission paths that are highly affected by errors. This method, however, involves the disadvantage that it cannot be applied for optical transmission paths having a bit error rate on an order of magnitude of $10^{-10}$.

SUMMARY OF THE INVENTION

The invention is based on the object of specifying a circuit arrangement as well as a method for minimizing bit errors in the regeneration of a digital signal sequence.

This object is achieved by a circuit arrangement for minimizing bit errors in a regeneration of digital data signals comprising: 1) a decision unit that has a data signal input from which digital data signals enter the decision unit, a decision criterion input from which a decision criterion enters the decision unit, and a bit sequence output from which a bit sequence is output based on a sampling of the data input signal and of the decision criterion, 2) a correction unit having an input into which the bit sequence enters, an output from which the correction unit outputs a corrected bit sequence or an error signal after the unit corrects the bit sequence with an error correction, and 3) an error analysis unit having a first input into which the bit sequence or error signal is entered, a second input into which the corrected bit sequence is entered, and an output at which a decision criterion formed from the corrected bit sequence and the bit sequence or error signal is output, which employs the use of neighboring bits of the corrected bit sequence.

This object is also achieved by a method for minimizing bit errors in a regeneration of digital data signals comprising the steps of sampling the data signals and generating a bit sequence, correcting the bit sequence and generating a corrected bit sequence or an error signal, and forming decision unit criterion with which data signals are sampled from the corrected bit sequence or error signa and the bit sequence, and utilizing the neighboring bits of the corrected bit sequence.

The invention has the advantage that no additional optical reception components are required for regeneration of received, digital signal sequences.

The invention has the further advantage that no artificial deterioration of the bit error rate must be induced in order to find out the direction in which, for example, the sampling time must be varied.

Further characteristics are described below.

Further characteristics of the invention can be seen from the following, more detailed explanation of an exemplary embodiment with reference to drawings.

FIG. 1 is a graph showing an eye pattern;

FIG. 2 is a block circuit diagram of a control arrangement;

FIG. 5 is a table that reproduces the functioning of an error analysis unit.

DESCRIPTION OF THE PREFERRED EMBODIMENTS

Figure 3:
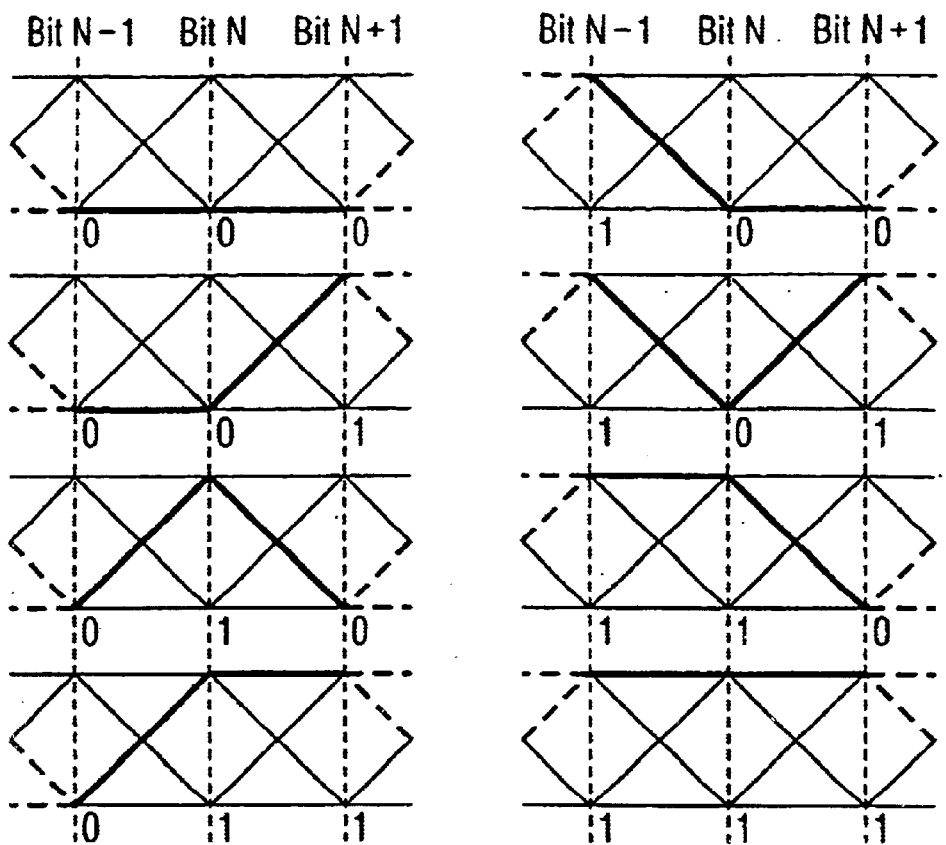
FIG. 3 is a sequence diagram showing individual bit sequences that yield the eye pattern when combined.

FIG. 1 shows an eye pattern. Temporal signal curves of a received bit sequence N−1, N, N+1 as shown in FIG. 3 are illustrated in the eye pattern. As is a rule, an eye-pattern as shown in FIG. 1 is derived from a superimposition of the received bit sequences N−1, N, N+1. A decision unit status EZ derives from the intersection between a voltage potential value SW for a threshold decision unit and a sampling time AP. The optimum voltage potential value SW for the threshold decision unit and the sampling time AP yields a minimum bit error rate in the regeneration of a received digital signal. As a rule, the position of the decision unit status EZ should be anticipated close to the center of the eye pattern. In optical systems that work with many optical fiber amplifiers, the voltage potential SW, however, can also lie close to the zero potential level.

FIG. 2 shows a block circuit diagram of a control arrangement for setting the sampling time AP and the voltage potential value SW for a decision unit. This control arrangement is essentially composed: a decision unit EE, a forward error correction unit VFK, an error analysis unit FA and of a first and second control filter F1, F2.

An incoming digital signal sequence DS is applied to an input of the decision unit EE. An output of the decision unit EE is connected to an input of the forward error correction unit VFK and to a first input E1 of the error analysis unit FA. A first output of the forward error correction unit VFK is connected to the first input E1. An error signal FS that contains an information about a deviation of the bit sequence EB from a corrected bit sequence KB is present at a second adjacent output of the forward error unit VFK. The second output of the forward error correction unit VFK is connected to a second input E2 of the error analysis unit FA.

A first output A1 of the error analysis unit FA has a first line pair L1 connected to an input of the first control filter F1. A second output A2 of the error analysis unit FA is connected to an input of the second control filter F2 with a second line pair L2. The first and second control filters F1, F2 are each respectively fashioned as a control filter with a time-weighted averaging. The outputs of the first and second control filter F1, F2 are connected to inputs of the decision unit EE. The first input E1 of the error analysis unit FA is charged with the bit sequence EB or with the error signal FS output by the forward error correction VFK, and a second input E2 of the error analysis unit FA is charged with the corrected bit sequence KB.

An optimized sampling time AP for a sampling unit is defined with the first control filter F1; an optimized value SW for a threshold decision unit is defined with the second control filter F2. A sampling decision unit and a threshold decision unit are arranged in the decision unit EE. For this control arrangement, the control criterion is the bit error rate that is to be minimized. In order to derive a control criterion for the sampling time AP and the threshold SW that describe a decision unit status EZ, the bit sequence EB that is received and still affected by errors is subjected to a forward error correction in the forward error correction unit VFK.

In addition to containing the actual information, the bit sequence EB also contains parity bits. An error localization is possible by interpretation of the information bits together with the parity bits. This forward error correction VFK is dimensioned such that the residual error probability of the corrected bit sequence KB is negligible.

The corrected bit sequence KB is optionally compared in the error analysis unit FA to the received bit sequence EB or to the error signal FS. Output quantities of the error analysis unit FA are increment commands and decrement commands that respectively lower or increase the value for the threshold SW and the sampling time AP. The modification of the threshold SW and of the sample AP is respectively collected and weighted in the control filters F1, F2 over a longer time span. The control filters F1, F2 respectively ensure that random, individual events do not influence the decision unit status EZ; rather, it is but only those events with a certain frequency of occurrence that have an influence on the decision unit status EZ.

The corrected bit sequence KB and the bit sequence EB are compared to one another bit-by-bit in the error analysis unit FA. Alternatively, the error signal FS that is adjacent at the first input E1 of the error analysis unit FA together with the corrected bit sequence KB can also be employed for the correction of the threshold SW and of the sampling time AP.

In the correction of the sampling time AP and of the voltage potential value for the threshold SW, the preceding and the following bit of the corrected bit sequence KB or of the bit sequence EB are taken into consideration.

A delayed processing of the successor bit without causality problems can be made available by intermediate storage that is required because of the forward error correction in the forward error correction unit VFK. For analysis of the digital data, the bit N to be interpreted in the bit sequence EB or the error signal FS, the corresponding bit N of the corrected bit sequence KB, the previous bit N−1 of the bit sequence EB or the corrected bit sequence KB and the successor bit N+1 of the bit sequence EB or the successor bit N+1 of the corrected bit sequence KB is employed. It is assumed that the bits N−1 and N+1 are error-free. There are eight variation possibilities for the statuses of the bits N−1, N and N+1 of the bit sequence EB or of the corrected bit sequence KB.

The possible signal curves of three successive bits are shown in FIG. 3: bit N−1, bit N and bit N+1 of a bit sequence.

Figure 4:
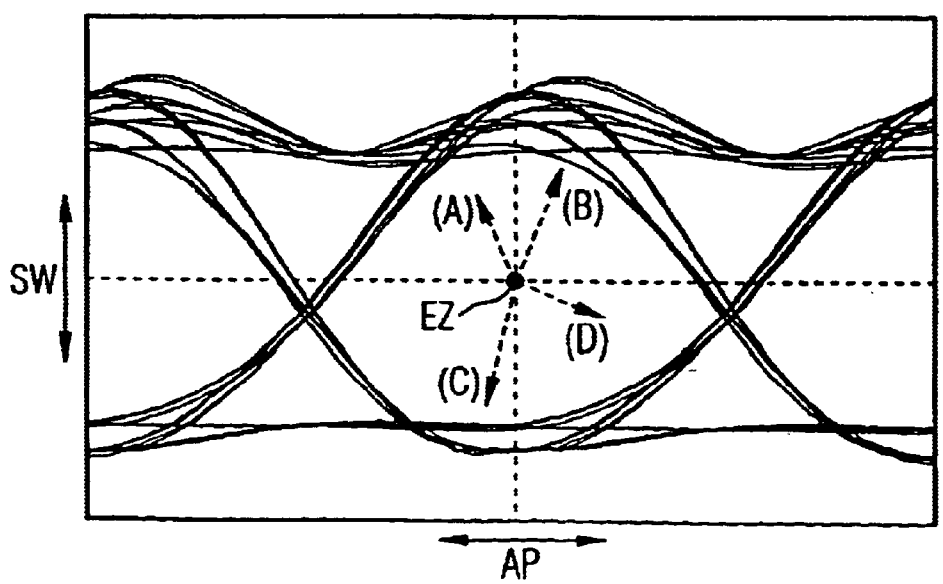
FIG. 4 is a graph showing a classification of possible decision unit conditions in conjunction with an eye pattern.

FIG. 4 shows an eye pattern with possible positionings of a decision unit status EZ. The decision unit status EZ usually does not lie at an optimum location within the eye pattern. The area within the eye pattern can, for example, be subdivided into four sub-regions A, B, C and D. The point of intersection of the two broken lines, which mark, first, a sampling time AB and, second, a threshold SW for a threshold decision unit, indicates the optimum decision unit status EZ. When, proceeding from the optimum setting of the decision unit status, the decision unit status EZ lies in one of the sub-regions marked with A, B, C or D, the following statements can be made about the position of the decision unit status EZ:

Sub-region A: sampling time AP is too early, the decision threshold SW is too high;

Sub-region B: sampling time AP is too late, the decision threshold SW is too high;

Sub-region C: sampling time AP is too early, the decision threshold SW is too low; and Sub-region D: sampling time AP is too late, the decision unit threshold SW is too low.

The region affiliation of the decision unit status EZ can be identified as follows on the basis of the bit sequence composed of the bit N−1, bit N and bit N+1: When, for example, the corrected bit sequence KB reads 011 and when a 0 was incorrectedly decided for the bit N, then the decision unit status EZ lies in the region A with high probability. An increment signal Inkr must then be applied to the line L1 in order to achieve a positive time shift of the sampling time AP, and a decrement signal Dekr must be applied to the line L2 in order to achieve a lowering of the decision unit threshold SW. When the corrected bit sequence KB 000 is present as in FIG. 3, column 1, line 1 and when a 1 was erroneously decided for the bit N, then the decision unit status EZ is most likely in the region C or D. This information is sufficient in order to derive an increment command Inkr for raising the decision unit threshold SW. In those instances in which the bit N of the received bit sequence and of the corrected bit sequence are identical, i.e., there is no bit error, neither increment signals nor decrement signals are output to the control filters F1 and F2 by the error analysis unit EE. A complete list that reproduces the function of the error analysis unit FA is shown in table form in FIG. 5.

The above-described method is illustrative of the principles of the present invention. Numerous modifications and adaptions thereof will be readily apparent to those skilled in this art without departing from the spirit and scope of the present invention.

I claim:

1. A circuit arrangement for minimizing bit errors in a regeneration of digital data signals, comprising:

a decision unit which comprises:

a data signal input from which said digital data signals enter said decision unit;

a decision criterion input from which a decision criterion enters said decision unit;

a bit sequence output from which a bit sequence is emitted based on a sampling of said data input signal and of said decision criterion;

a correction unit comprising:

an input into which said bit sequence enters; and an output, said correction unit correcting said bit sequence with an error correction and emits a corrected bit sequence or an error signal to said output; and an error analysis unit comprising:

a first input into which said bit sequence or said error signal is entered;

a second input into which said corrected bit sequence is entered; and an output, to which said error analysis unit emits a decision criterion formed from said corrected bit sequence and said bit sequence or said error signal using neighboring bits of said corrected bit sequence.

2. A circuit arrangement according to claim 1, wherein said correction unit implements a forward error correction.

3. A circuit arrangement according to claim 1, wherein said error analysis unit forms a sampling time as said decision criterion.

4. A circuit arrangement according to claim 1, wherein said error analysis unit forms a threshold as said decision criterion.

5. A circuit arrangement according to claim 1, wherein said error analysis unit conducts said decision criterion to said decision unit via a control filter.

6. A circuit arrangement according to claim 5, wherein said control filter is a control filter that implements time-weighted averaging.

7. A method for minimizing bit errors in a regeneration of digital data signals, comprising the steps of:

sampling said data signals;

generating a bit sequence;

correcting said bit sequence and generating a corrected bit sequence or an error signal; and forming a decision unit criterion with which data signals are sampled from said corrected bit sequence or the error signal and the bit sequence (EB), taking respectively neighboring bits of said corrected bit sequence into consideration.

8. An apparatus for minimizing bit errors during regeneration of a digital signal, the apparatus comprising:

a decision unit configured to receive the digital signal and output a bit sequence based on a sampling of the digital signal according to at least one decision criterion;

a correction unit configured to receive the bit sequence, correct the bit sequence according to a prescribed error correction and output a corrected bit sequence and an error signal; and an error analysis unit configured to determine the at least one decision criterion based on a comparison of the corrected bit sequence to one of the bit sequence and the error signal that employs previous and successor bits of one of the corrected bit sequence and the bit sequence.

9. The apparatus as defined in claim 8, wherein the error analysis unit determines a sampling time as the at least one decision criterion.

10. The apparatus as defined in claim 8, wherein the error analysis unit determines a voltage value as the at least one decision criterion.

11. The apparatus as defined in claim 8, wherein the error analysis unit delivers the at least one criterion to the decision unit via a control filter.

12. The apparatus as defined in claim 11, wherein the control filter performs time-weighted averaging.

13. The apparatus as defined in claim 8, wherein when a bit of the corrected bit sequence equal to a value N is analyzed by the error analysis unit, the previous bit is equal to N−1 and the successor bit is equal to N+1.

* * * * *